Oct. 1, 1963   R. M. RANEY ETAL   3,105,566
STORAGE BATTERY AND HOLDDOWN MEANS THEREFOR
Filed March 11, 1959

INVENTOR
LOUIS ZEDNIK, JR.
ROBERT M. RANEY
BY
ATTORNEY

United States Patent Office 3,105,566
Patented Oct. 1, 1963

3,105,566
STORAGE BATTERY AND HOLDDOWN
MEANS THEREFOR
Robert M. Raney, Chardon, Ohio, and Louis Zednik, Jr., Clawson, Mich., assignors to The Electric Storage Battery Company, a corporation of New Jersey, and Chrysler Corporation, a corporation of Delaware
Filed Mar. 11, 1959, Ser. No. 798,694
1 Claim. (Cl. 180—68.5)

The present invention relates to the mounting of electric storage batteries in vehicles. More specifically, the present invention is concerned with a new and improved storage battery and novel means for holding the battery within the battery receiving tray of an automobile or truck.

The battery used in an automobile is usually supported on a battery receiving tray within the engine compartment of the vehicle in a position permitting ready access thereto. Generally, it is secured to the battery receiving tray by some kind of a frame or holddown which is applied to the top of the battery and connected to the receiving tray by bolts. The holddown means must not only be designed to secure the battery firmly in the tray but must also be adapted to permit easy installation and removal of the battery, and not obstruct the battery vent plugs, or interfere with the battery terminal posts. Since conventional holddown frames are usually formed of iron or steel and are applied against the top of the battery, they are particularly subject to corrosion and damage from contact with battery electrolyte and acid fumes and as a result, require frequent replacement. In addition, conventional holddown frames are generally disposed in close proximity to the battery terminal posts and the cables connected thereto and thus are in a position to short circuit the battery.

An object of the present invention is to provide a new and improved battery and holddown means which permits the positioning of the holddown means so as to make it less subject to contact with battery electrolyte with consequent corrosion.

Another object of the present invention is to provide a new and improved battery casing and holddown means which positions the holddown means away from the battery terminal posts and the cables connected thereto.

Still another object of the present invention is to provide a new and an improved battery holddown means which is particularly adapted to securely fasten a battery to the battery receiving tray in a vehicle and which is adapted to permit quick battery installation and removal.

A further object of the present invention is to provide a novel battery holddown means which is non-complex, inexpensive to manufacture.

Another object of the present invention is to provide a battery holddown means which is adapted for use with batteries of different sizes.

The various objects of the present invention are achieved by providing pockets or recesses in the side or end walls of a battery casing near the bottom of the casing and by securing the battery to the battery receiving tray by clamping means adapted to grip the casing at these pockets. With the battery adapted to be secured to the battery receiving tray, by bottom holddown means, the holddown means themselves may be greatly simplified. In accordance with the present invention, simplified clamping means may be tightened against the battery casing by means of a bolt or through a spring action, or a combination of the two.

In accordance with the foregoing general objects, it is intended now to provide a battery casing with a pocket in at least one end wall, near the bottom, and a ledge extending entirely across the bottom of the pocket. It is a further intent to form the ledge, the inner portion of which is integral with the casing material at the inner side of the pocket, with ends that are integral with columnar portions of the material of the casing at each end of the pocket so as to distribute the stresses imposed upon the ledge throughout strong portions at the end of the casing and thereby fortify the ledge against breaking off or imposing local stresses on the casing wall or bottom. Furthermore, by utilizing a clamping plate having a ledge-engaging portion narrower than the ledge, and with flanges which prevent the free edge of the plate from engaging against the casing surface at the inner side of the pocket, the battery casing is protected against damage by the clamping plate.

A better understanding of the present invention may be had from the following description when read with reference to the accompanying drawing of which:

Figure 1:
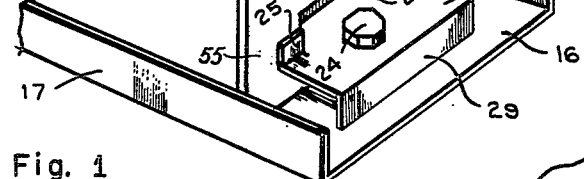
FIG. 1 is a perspective view of a portion of the battery of the present invention secured to a vehicle battery receiving tray by means of one embodiment of the battery holddown clamp of the present invention.
Figure 2:
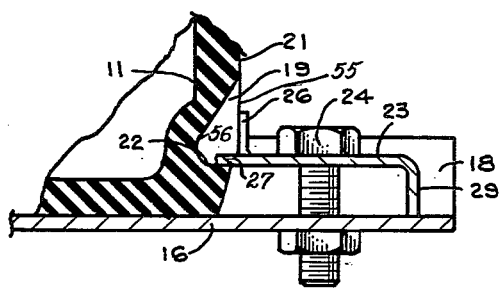
FIG. 2 is a side elevation taken in partial section of the holddown clamp and battery shown in FIG. 1.

Referring now to FIGS. 1 and 2, the numeral 10 indicates a storage battery having a casing 11 of generally rectangular form and a cover 12 composed of a plurality of sections which usually correspond to the number of cells of the battery. In the partial view of FIG. 1, only one of the sections of the cover 12 is shown. Similarly, only one of the battery terminals 13, one of the battery vent plugs 14, and one of the intercell connectors 15 are shown. When installed in a vehicle, the battery 10 is supported on a battery receiving tray 16 which is generally located within the engine compartment of the vehicle. As shown, the battery receiving tray 16 has upwardly extending side rims 17 and 18 into which the battery casing 10 is adapted to fit.

Unlike the conventional battery casing, the battery casing 11 of the battery 10 has a pocket 19 near the bottom of its end wall 21. It should be understood that while not shown, the casing 11 has a similar pocket in its other end wall. The pocket 19 slopes inward away from the outer surface of the end wall 21 to a flat bottom ledge 22. The battery 10 is secured to the receiving tray 16 by means of a holddown clamp 23 which is bolted to the receiving tray 16 by means of the bolt 24. The holddown clamp 23 has a pair of upwardly projecting flanges 25 and 26 which abut against the end wall 21 of the battery casing 11, leaving a projection 27, extending into the pocket 19. The holddown clamp 23 is adapted to be tightened against the battery casing 11 by means of the bolt 24 which passes through a slot in the clamp 23 and through the battery receiving tray 16. As shown, the clamp 23 has a downwardly projecting flange 29, having approximately the same height as the bottom ledge 22 of the battery holddown pocket 19, which maintains the clamp in a substantially horizontal position when the bolt 24 is tightened. It should be understood that a similar clamping arrangement can be employed to secure the battery 10 to the receiving tray 16 at its other end.

Figure 3:
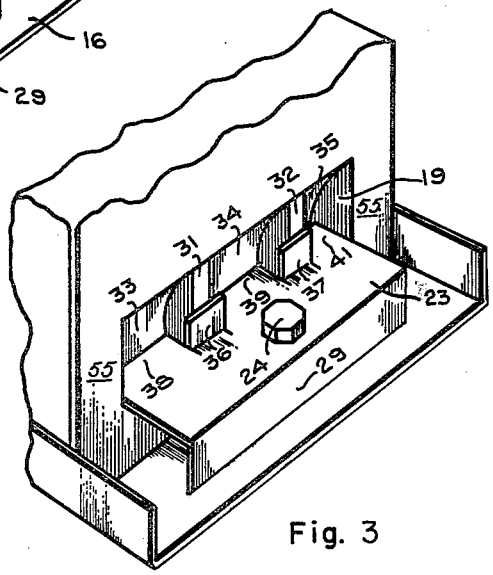
FIG. 3 is a perspective view of a modification of the battery and holddown means of FIG. 1.

Referring now to FIG. 3, there is shown a partial perspective view of a modification of the battery holddown means of FIG. 1. In the modification, the holddown pocket 19 is provided with a pair of vertical ribs 31 and 32 which divide the pocket 19 into three sections, 33, 34 and 35. The holddown clamp 23 has also been modified by providing a pair of upwardly projecting flanges 36 and 37 adapted to abut against the vertical ribs 31 and 32 of the holddown pocket and provide three outward projections 38, 39 and 41 which extend into the three sections 33, 34 and 35 of the pocket 19 and engage the bottom edge of the pocket. The pocket arrangement of this figure provides a stronger pocket and strengthens the battery case.

Figure 4:
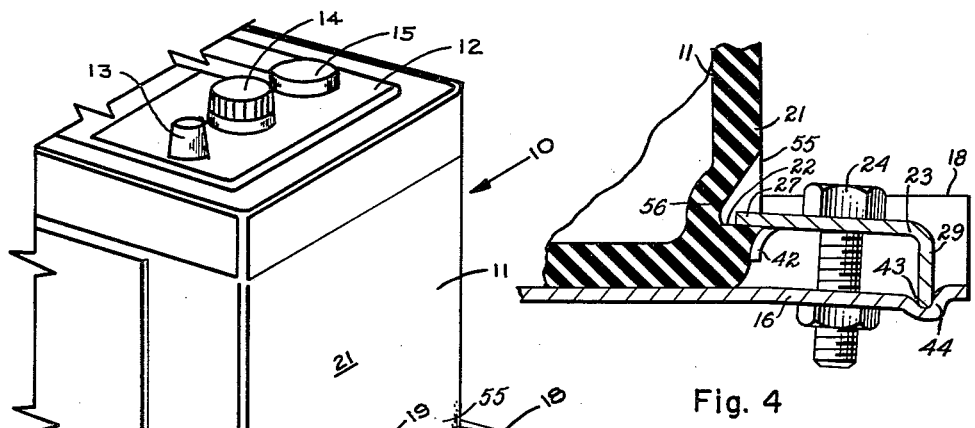
FIG. 4 is a side elevation, taken in partial section, of another embodiment of the holddown clamp of the present invention utilized in cooperation with the battery shown in FIG. 1.

Referring now to FIG. 4, there is shown a side elevation taken in partial section of a modification of the holddown clamp of the present invention. As modified, the holddown clamp 23 engages the end wall 21 of the battery casing 11 by means of a downwardly extending flange 42. In addition, the receiving tray 16 has been provided with a groove 43 adapted to receive the flange 29 of the holddown 23. In this construction, the flange 29 abuts against the side 44 of the groove 43 in such a manner as to prevent any tendency of the battery to pivot around the fulcrum formed at the junction at the bolt 24 and the tray 16.

From the foregoing, it can be seen that by providing holddown pockets in the walls of the battery casing near the bottom thereof, it is possible to provide for battery holddown means which overcome all the disadvantages of prior art holddown means. For example, since the holddown means of the present invention are positioned near the bottom of the battery casing away from the battery vent plugs, terminals and straps, they are less likely to be subject to electrolyte corrosion and can not interfere with the battery terminals or the cable attached thereto. In addition, the present invention has replaced the bulky holddown frames of the prior art which necessitated a special holddown frame for every size battery, with a less complex yet more effective holddown clamp which is applicable for use with batteries of different sizes. Still further, this has been accomplished with holddown means that permit extremely rapid and easy battery installation and removal. It should be noted that in the construction of the conventional hard rubber vehicle battery casings, the thickness of these casings near the bottom is such that the holddown pocket can be provided therein without substantially weakening the casing. The strength of the ledge and adjacent casing wall structure is further enhanced by the integral connection of the ends of ledge 22 with columnar portions 55 of the casing wall which define the sides of pocket 19. The inner side of ledge 22 is integral with the material of the casing wall at the lower end of the inner surface 56 of pocket 19, and the free edge of the projection 27 (FIGS. 1 and 2) is blocked from engagement with inner surface 56 by flanges 25 and 26 which are spaced from the free edge of projection 27 by a distance less than the depth of ledge 22. The same principle applies to the embodiments of FIGS. 3 and 4, in the latter of which the flange 42 is shown spaced from the free edge of the projection 27 by a distance less than the depth of ledge 22.

It will be obvious to those skilled in the art that modifications can be made in the present invention without departing from the spirit of the invention as set forth in the appended claim. For example, the bolt utilized to fasten the holddown clamp to the battery tray may pass through a slot, instead of a hole, and thus, permit the mounting of a longer battery or the positioning of the battery to be shifted on the tray. In addition, it will be obvious that pockets may also be provided in the side walls of a battery casing and the casing clamped to a tray at all four sides.

What is claimed is:

In combination, a storage battery having a substantially rectangular casing with vertical side walls, a flat bottom, and a pocket in the outer side of at least one of the side walls thereof near the bottom, said pocket having opposite vertical sides defined by laterally spaced inwardly facing surfaces of columnar portions of the material of said side wall, an inner side defined by the outer surface of an indented portion of the side wall between said columnar portions, and a bottom defined by a horizontal ledge of said side wall material extending entirely across the pocket bottom, the inner side of said ledge being integral with the material at the inner side of the pocket and the ends of the ledge being integral with the columnar portions at each side of the pocket, the depth of said ledge, as measured horizontally outward from the inner side of the pocket, being substantially equal to the widths of the opposed surfaces of the columnar portions at the ends of the ledge, a battery receiving tray having a flat surface adapted to support the bottom of said battery and an end portion extending laterally outward from the battery supporting surface, a clamp for holding said battery on said tray, said clamp comprising a plate having a flat portion along a free edge at one side thereof adapted to rest on said horizontal ledge, a downturned flange on the other side of said plate adapted to rest on the end portion of said tray, a clamp screw engaging between said tray and a portion of said plate between said downturned flange and the free edge portion for clamping said edge portion downwardly against said horizontal ledge, and flange means extending generally at right angles to said plate and spaced inwardly from said free edge portion, the distance from said flange means to said free edge portion being less than the depth of the ledge, whereby to block engagement of the free edge of the plate with the surface at the inner side of the pocket while preventing sidewise motion of the battery.

References Cited in the file of this patent
UNITED STATES PATENTS

| | | |
|---|---|---|
| 2,206,306 | Sager | July 2, 1940 |
| 2,225,592 | MacFadden | Dec. 17, 1940 |
| 2,354,195 | Brown | July 25, 1944 |
| 2,627,385 | Tinnerman | Feb. 3, 1953 |
| 2,783,293 | Fritsch | Feb. 26, 1957 |
| 2,980,195 | Herbst | Apr. 18, 1961 |

FOREIGN PATENTS

| | | |
|---|---|---|
| 617,869 | France | Nov. 29, 1926 |